United States Patent [19]

Moreau et al.

[11] Patent Number: 5,069,163
[45] Date of Patent: Dec. 3, 1991

[54] TIE STALL DIVIDER

[75] Inventors: Joseph R. Moreau, New Hartford; John J. Dyer, Westmoreland, both of N.Y.

[73] Assignee: Norbco, Inc., Westmoreland, N.Y.

[21] Appl. No.: 612,619

[22] Filed: Nov. 14, 1990

[51] Int. Cl.[5] .............................................. A01K 1/00
[52] U.S. Cl. ...................................................... 119/27
[58] Field of Search ................... 119/27, 14.03, 16, 20; D30/119, 108, 113, 120

[56] References Cited

U.S. PATENT DOCUMENTS

| | | | |
|---|---|---|---|
| 1,253,494 | 1/1918 | James | 119/27 |
| 2,046,585 | 7/1936 | Shattuck | 119/27 X |
| 4,217,860 | 8/1980 | Gloggles | 119/27 |
| 4,649,864 | 3/1987 | Osthoff | 119/27 |
| 4,936,258 | 6/1990 | Spinder | 119/27 |

FOREIGN PATENT DOCUMENTS

| | | | |
|---|---|---|---|
| 0057490 | 8/1982 | European Pat. Off. | 119/27 |
| 0090470 | 10/1983 | European Pat. Off. | 119/27 |
| 3317450 | 11/1984 | Fed. Rep. of Germany | 119/27 |
| 2440686 | 7/1980 | France | 119/27 |

Primary Examiner—Robert P. Swiatek
Assistant Examiner—Todd E. Manahan
Attorney, Agent, or Firm—Wall and Roehrig

[57] ABSTRACT

A tie stall divider for cattle stalls or other animal stalls is formed of a single continuous main rail that is bent into a sequence of bent and straight rail portions that lie in a generally vertical plane. There is a single generally vertical support post that is anchored into a curb. A first bend joins a top bend of the support post to a lower rail portion that extends generally distally and upwards to a nose portion, that connects to a generally horizontal upper tube which extends distally past the position of the vertical support post. Thereafter, a loop is formed having a bend formed therein that lies adjacent the first bend, and a vertical support tube whose end abuts the horizontal upper tube. The first and second bend can be welded together, and the tube end can be welded to the abutting horizontal tube. A sleeve is disposed over the first bend and extends down over an upper part of the support post into the curb.

24 Claims, 1 Drawing Sheet

TIE STALL DIVIDER

BACKGROUND OF THE INVENTION

This invention relates to the construction of stalls for cows or other farm animals, and is more particularly directed to the construction of tie stalls wherein upright dividers are supported on respective single support posts embedded into a concrete floor of the stall. The invention is also directed to a stall divider which has a significant clearance over the floor at its entrance or proximal end to permit the cow or other animal to lie down while in the stall. The divider of this construction reduces risk of contact of the animal with the divider so that the divider leads to increased cow comfort and reduced incidence of bruising, abrasion, or other injury.

Various tie stall constructions have been proposed in connection with cattle barns. In many of these stall designs, dividers are formed of pipe, rail, or tubing and are supported in a generally vertical plane by one or more support posts embedded in a concrete floor of the stall, typical stall construction is described in U.S. Pat. No. 2,642,037. Other constructions for stalls are shown in U.S. Pat. Nos. 3,421,478; 3,986,481; and 4,217,860. A divider structure for use i a tie-type cattle stall is shown in U.S. Pat. No. Des. 273,903.

The construction for a stall divider of U.S. Pat. No. Des. 273,903 has a number of functional advantages. The divider structure is simple, and is supported on a single support post that is embedded or anchored in a curb that separates the cow stand portion of the stall from a feed manger portion. This construction has an upright support post and a tubular member welded to it to define the dividing wall between stalls. A horizontal upper tube is welded to it to separate adjacent stalls. A horizontal upper tube is welded to the top of the support post. The distal part of the tube bends and then extends proximally back to the support post where it is welded. Similarly, the proximal part of the tube loops down and back to the support post, where it is welded. With no second support post, a cow in the stall is free to lie down without pushing against the divider. A standing cow is kept in place, which leads to a cleaner stall bed.

However, the divider does have a significant weakness in that there are welded joints where the lower tube attaches to the support post. This weld is strained each time that a cow presses against the rail or tubing. There have been many failures in the conventional loop stall design. The welds can fail after a time. In some cases the main upright pipe actually ruptures.

The outer sleeve or rust shield has to extend at least about two inches above the curb, and the loop is welded to the upright above the rust shield. This means that with the conventional rust shield the stall had to be installed higher off the floor than desirable. It would be desirable to lower the position of the lower horizontal rail, but this was not possible with the conventional design of stall divider.

OBJECTS AND SUMMARY OF THE INVENTION

It is an object of this invention to provide a simple, straightforward cattle stall divider that avoids the problems of the prior art.

It is another object of this invention to provide a stall divider which permits cows to recline or stand without obstructing their legs, but which can do this without impairing the structural integrity of the divider.

It is a still further object to provide a stall divider construction which achieves maximum strength and versatility, and which employs only a minimum of welded joints.

According to an aspect of this invention a tie stall divider is formed of a single continuous main rail that is bent into a sequence of bent and straight sections that lie in a generally vertical plane. One of these sections becomes a generally vertical support post that is embedded in a curb that rises from the stall floor. A first bend joins the top of the support post to the next successive one of the straight positions. Most favorably, a sleeve portion is disposed over the upper part of the support post, the first bend and an initial part of the next successive straight section.

In the preferred embodiment the section joined to the first bend is a diagonal rail member that extends generally proximally and upwards. An upper, generally horizontal rail member is joined to the diagonal rail member and this member extends distally beyond the support post. A loop is formed in the continuous main rail distally of the curb, and includes a down tube or down rail that drops from the distal end of the upper rail member and also extends proximally to the upper end of the support post. There, a second rail connects the lower end of the down rail to a vertical support rail that rises from the second bend to a portion of the upper rail member that is over the curb. The end of the vertical support rail is welded to the horizontal upper rail, and the first and second bends are welded together. Gussets can be welded to the junction of the first and second bend for added strength.

The divider is formed by generally available tube bending techniques. The support sleeve or rust shield is installed over the continuous rail before forming the first bend. Bending the tube after placing the sleeve over it is not common in this industry. The bending die for forming the first bend must be larger, to accommodate the sleeve, and somewhat more power is required than with conventional bending techniques.

A series of tie stalls is constructed by installing several dividers in parallel. Reinforcing steel bars can be welded to the support posts before the curb is poured, the curb being formed of concrete.

The above and many objects, features, and advantages of this invention will become apparent from the ensuing detailed description, which is to be read in conjunction with the accompanying Drawing.

DETAILED DESCRIPTION OF THE PREFERRED EMBODIMENT

Figure 1:
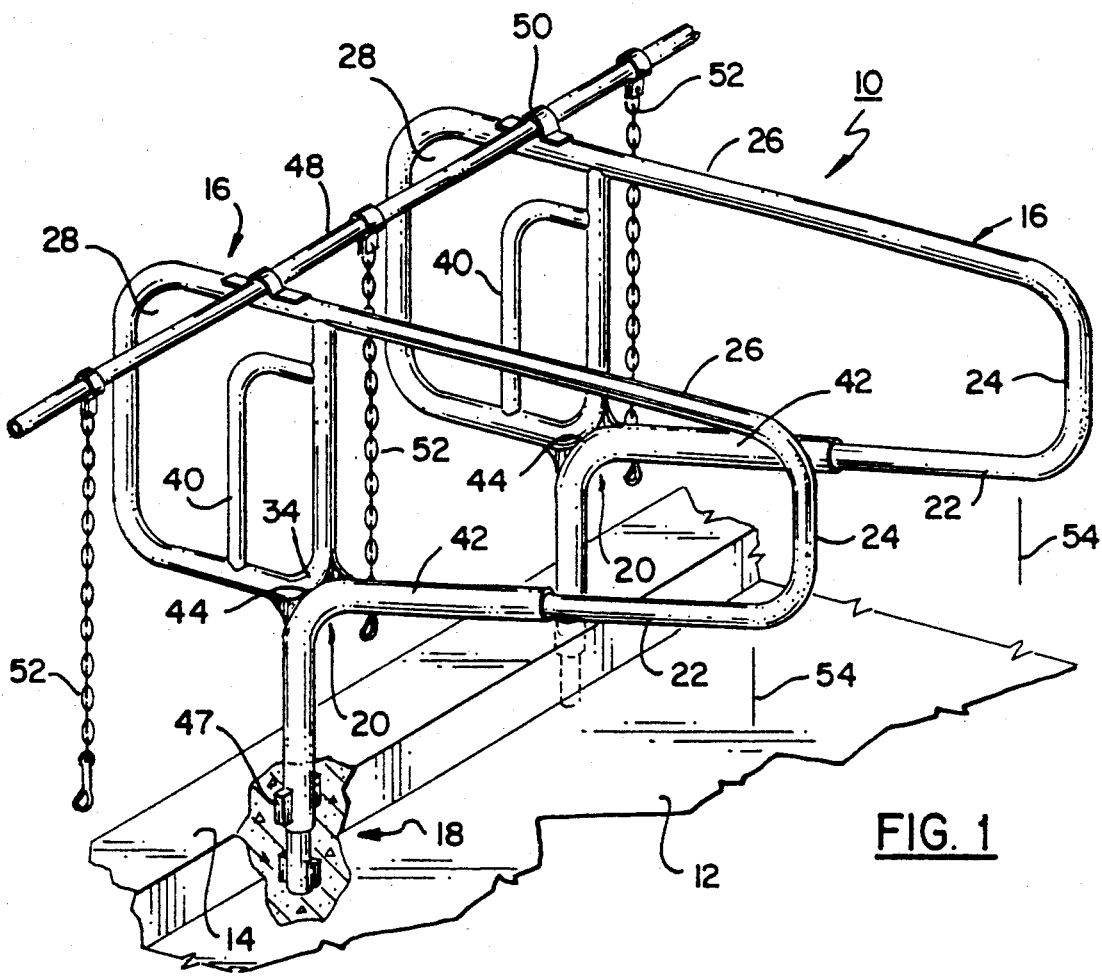
FIG. 1 is a perspective view of a tie stall arrangement which incorporates the stall divider of an embodiment of this invention.

With reference to FIG. 1 of the drawing, the cattle stall structure 10 has a concrete base or floor 12 and a raised curb 14, also of poured concrete. Tie stall dividers 16 are spaced apart to define between them a cattle stall position.

Figure 2:
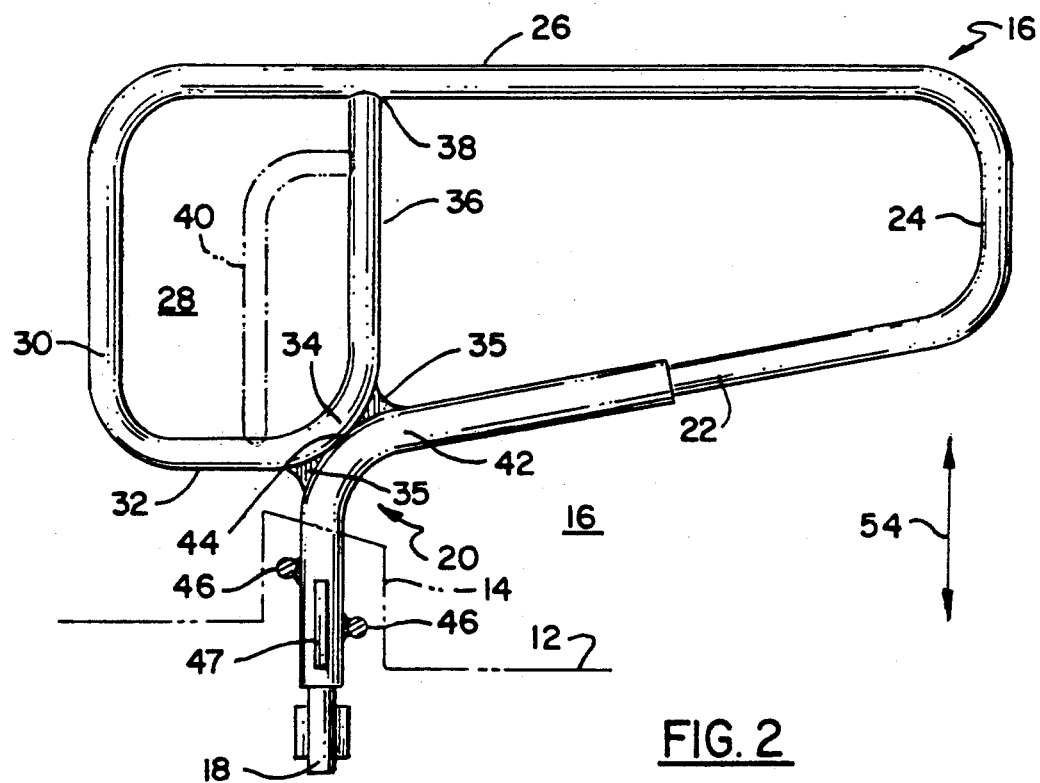
FIG. 2 is a side elevation of the divider of this embodiment.

As shown in FIG. 2, each of these dividers 16 is formed from a single continuous tube or rail bent into a succession of curved and straight sections, one of which is a vertical support post 18 whose lower end is embedded in the curb 14. At the upper end of the support post 18 is a first tube bend 20 which has an opening of about 100 to 110 degrees, and this bend joins to a diagonal lower tube or bar 22 that extends proximally and upwards to a nose portion 24 at the proximal end of the divider. The nose portion 24 rises to a generally horizontal upper tube or rail 26. The upper tube extends distally beyond the position of the support post 18. On the distal side of the curb, the single continuous tube or rail is bent to form a loop 28 that includes a down tube 30 and a lower horizontal tube 32 which extends proximally back to the vertical support post 18. Here a second tube bend 34, which has an angle of approximately 90 degrees, connects to a vertical support tube 36. This tube 36 extends vertically upward until it abuts the horizontal upper tube 26 where a weld 38 secures the end of the support tube 36 to the horizontal tube.

A pair of generally triangular gussets 35 can be disposed on either side of the junction of the first and second bends 20 and 34 for reinforcement. Also, anti-twist bars 47 can be tack welded onto the support post at the portion that is embedded in the curb 14.

An optional L-shaped tube member 40, shown in full line in FIG. 1 and in broken line in FIG. 2, can be welded or otherwise attached to the divider 16 inside the loop 28.

A support sleeve 42 extends over the top part of the support post 18, the bend 20, and the lower or distal part of the lower tube 22.

The support sleeve 42 extends down into the curb 14, and also extends well above the bend 20. The support sleeve 42 serves as an anti-rust shield, gives the divider 16 greater strength, and helps the divider resist stress forces which may result from cattle pushing against the nose portion 24. Anti-twist bars 47 are also tack welded to the sides of the sleeve 47, as well as to front and back of the support post 18.

As shown in FIGS. 1 and 2, a weld 44 secures the first bend 20 and the second bend 34, thus joining the support post 18 and the support tube 36. The gussets 35 are also welded to the support tube 36 and to the bend 34. As is evident from the drawing figures, the support post and support tube need not be precisely aligned axially or angularly.

In the stall structure 10 reinforcing bars 46 which run transversely within the curb 14 can be welded to the support sleeve 42 or to a protruding part of the support post 18, prior to pouring the concrete and forming the curb 14.

As shown in FIG. 1, a transverse tie bar 48 can be connected with suitable fasteners 16 across the top of the distal hoops 28. Cow restraining chains 52 or other conventional equipment can be attached onto the tie bar.

Because of the single support post construction of these dividers 16, there is an ample open space 54 beneath the diagonal lower tube 22. This space 54 permits a cow within the stall to recline or lie down on the floor if she desires, without encountering any fixed obstacles. On the other hand, because no additional horizontal space needs to be provided for this, the dividers 16 can be placed close enough together to confine the cow while standing.

Because the support sleeve 42 or rust shield extends upward and beyond the bend 20, it is possible to lower the overall height of the stall divider by two inches or more. Actually, the bend 20 can extend into the curb 14.

The result of this is that the stall is positioned at the desired height, and the stall itself is considerably stronger than was previously possible. Also, it is not necessary to weld around the outer end for the rust shield or sleeve 42. This increased height position the end of the sleeve 42 well above any feed acids, fecal matter or other fluids that might corrode the divider. Also, welding at this point is not required because of the near horizontal orientation of the sleeve 42.

Because of the extra strength that results from this stall design, the need for a second post, which would be embedded in the distal portion of the cow bed, is entirely eliminated. This eliminates the common problem of corrosion of the second post at the floor line due to the corrosive nature of the animal fecal matter and urine that accumulate in the distal portion of the stalls. This rust problem is eliminated by entirely eliminating the rear or second post. In addition, the one-post design increases the cow comfort, as previously mentioned.

Instead of the configuration as shown in FIGS. 1 and 2, the support post 18 could instead be connected on the first bend to the distal loop, and the diagonal tube 22 could be connected at its lower or distal end by the second bend to the vertical support tube 36. In either that case or in the case of the described embodiment, the entire divider can be of a single tube construction.

In order to construct this divider 16, the support sleeve 42 is slipped over the blank tube while straight, and then the first bend 20 is formed in suitable tube bending apparatus. Thereafter, the loop portion 28 is formed, and the nose portion 24 is then made by bending so as to place the second bend 34 adjacent the first bend 20 in the support sleeve 42. Thereafter the welds 38 and 44 are made. The gussets 35 are welded in place and the anti-twist bars 47 are welded onto the support sleeve 42 and onto the support post 18.

An alternative embodiment of this stall divider has a bend, horizontal rail, nose portion and upper tube, but omits the loop. The vertical support tube is provided as a separate member. The rust shield or sleeve is positioned over the support post and bend, as in the other embodiment. This alternative embodiment is illustrated, e.g. in Des. patent application Ser. No. 07/617,539.

While this invention has been described in detail with reference to a preferred embodiment, it should be understood that the invention is not limited to that precise embodiment. Rather, many modifications and variations would present themselves to those of skill in the art without departing from the scope and spirit of this invention as defined in the appended claims.

What is claimed is:

1. A tie stall divider for dividing a row of animal stalls to define the animal stalls on either side of the divider, the divider being formed of a single continuous main rail that is bent into a sequence of bent and straight rail portions that lie in a generally vertical plane; said bent and straight rail portions including a single generally vertical support post that is anchored in a curb, and a first bend joining a top end of the support post to a next successive one of said rail portions, the tie stall divider being supported only by said single support post.

2. A tie stall divider according to claim 1 wherein said divider also comprises a bent sleeve portion disposed over said first bend and extending down over an upper portion of said support post and into said curb.

3. A tie stall divider according to claim 1 further comprising at least one anti-twist bar affixed onto said support post.

4. A tie stall divider for dividing a row of animal stalls to define the animal stalls on either side of the divider, the divider being formed of a single continuous main rail that is bent into a sequence of bent and straight rail portions that lie in a generally vertical plane; said bent and straight rail portions including a single generally vertical support post that is anchored in a curb, and a first bend joining atop end of the support post to a next successive one of said rial portions; and wherein said next successive rail portion is a diagonal rail member that extends generally proximally and upwards, and wherein an upper generally horizontal rail member joined thereto extends distally beyond said support post, a down rail extends generally downward and proximally from a distal end of said upper rail member to a lower end adjacent said support post, and second bend connects the lower end of the down rail to a vertical support rail that rises from said second bend to a portion of the upper rail member that is over said curb.

5. A tie stall divider according to claim 4 wherein said second bend is joined to said bent sleeve portion by welding.

6. A tie stall divider according to claim 4 wherein the vertical support rail is welded to an under surface of said upper rail member.

7. A tie stall divider according to claim 4 further comprising a pair of gussets disposed between the first and second bends and welded thereto.

8. A tie stall divider for dividing a row of animal stalls to define animal stalls on either side of the divider, the divider comprising an upright curb post that is anchored into a curb in a floor of the row of stalls, a lower rail that extends proximally to a nose member that defines a proximal end of an upper, generally horizontal rail that extends distally beyond the position of the curb post to a down rail that extends downwards and proximally from a distal end of said upper rail to a lower end of the down rail adjacent said curb post, and a vertical support rail extending from adjacent said curb post upwards to said upper rail; wherein said divider is formed of a continuous length of rail with a first bend joining the curb post to one of the lower rail and the down rail and a second bend joining the other of the lower rail and down rail to a lower end of said vertical support rail.

9. A tie stall divider according to claim 8 wherein said first and second bends are formed adjacent one another and are welded to one another.

10. A tie stall divider according to claim 8 wherein said lower rail extends diagonally upwards from said curb post to nose rail.

11. A tie stall divider according to claim 8 wherein a sleeve is disposed over at least an upper portion of said curb post, said first bend, and a portion of the associated one of the lower rail and down tube which joins the first bend to the curb post.

12. A tie stall divider according to claim 11 wherein said sleeve is of sufficient length to extend down into said curb.

13. A tie stall divider according to claim 8 wherein said curb post is the only member supporting the divider above said floor.

14. A tie stall arrangement comprising a row of stalls including a floor which has a curb rising above the floor and extending transversely along the row of stalls; and a plurality of stall dividers spaced apart from one another and arranged in parallel to define said animal stalls therebetween, each said stall divider being formed of a single continuous main rail that is bent into sequence of bent and straight rail portions that lie in a generally vertical plane; said bent and straight rail portions including a single, generally vertical support post that is embedded in the curb and a first bend joining a top end of the support post to the next of the rail portions in sequence, the divider being supported from the floor only by said single support post.

15. A tie stall arrangement according to claim 14 wherein said dividers each also include a bent sleeve portion disposed over said first bend and extending down over said support post into said curb.

16. A tie stall arrangement comprising a row of stalls including a floor which has a curb rising above the floor and extending transversely along the row of stalls; and a plurality of stall dividers spaced apart rom one another and arranged in parallel to define said animal stalls therebetween, each said stall divider being formed of a single continuous main rail that is bent into sequence of bent and straight rail portions that lie in a generally vertical plane; said bent and straight rail portions including a generally vertical support post that is embedded in the curb and a first bend joining a top end of the support post to the next of the rail portions in sequence;

wherein said next-in-sequence rail portion is a diagonal rail member that extends generally proximally and upward, and wherein an upper rail is joined thereto which extends generally horizontally and distally beyond said curb, a down rail extends generally downward and proximally from a distal end of the upper rail to a lower end adjacent said support post, and a second bend connects said lower end of the down rail to a vertical support rail that rises from said second bend to a portion of the upper rail that is over said curb.

17. A tie stall arrangement according to claim 16 wherein said first bend and said second bend are secured to one another by welding.

18. A tie stall arrangement according to claim 16 further comprising a pair of gussets welded to and joining said first and second bends.

19. A tie stall arrangement according to claim 16 wherein said curb is poured of concrete, and further comprising a plurality of reinforcing bars that extend within said curb and which are welded to the support posts of said dividers.

20. A tie stall arrangement according to claim 16 further comprising a tie bar extending transversely across said row of stalls and attached onto the upper rails of said dividers.

21. A tie stall arrangement according to claim 16 further comprising at least one longitudinally extending antitwist bar welded onto each said support post.

22. A tie stall arrangement according to claim 16 wherein said dividers each also include a bent sleeve portion disposed over said first bend and extending down over said support post into said curb.

23. A method of forming a cattle stall divider comprising bending an elongated continuous rail into a sequence of bent and straight rail portions that lie generally in a single plane, wherein a first end of the continuous rail forms a support post and is joined by a first bend to a substantially straight lower rail that extends distally therefrom, including forming other bends to define an upper rail that extends distally, a loop that extends down to a second bend that connects to a vertical support rail whose end abuts the upper rail; said bending including placing the first and second bends adjacent to each other; welding the first bend to the second bend; and welding the end of the support rail to the upper rail.

24. A method of forming a cattle stall divider according to claim 23 further comprising sliding a tubular support sleeve over the continuous rail, prior to bending the same, to a position extending over the position of the first bend and over portions of the support post and lower rail adjacent said first bending and forming said first bend in said continuous rail and in the overfitting support sleeve.

* * * * *